(12) United States Patent
Kiku

(10) Patent No.: US 12,247,527 B2
(45) Date of Patent: Mar. 11, 2025

(54) THROTTLE DEVICE

(71) Applicant: MIKUNI CORPORATION, Tokyo (JP)

(72) Inventor: Yuta Kiku, Odawara (JP)

(73) Assignee: MIKUNI CORPORATION, Tokyo (JP)

( * ) Notice: Subject to any disclaimer, the term of this patent is extended or adjusted under 35 U.S.C. 154(b) by 0 days.

(21) Appl. No.: 18/166,250

(22) Filed: Feb. 8, 2023

(65) Prior Publication Data
US 2023/0265801 A1   Aug. 24, 2023

(30) Foreign Application Priority Data
Feb. 24, 2022   (JP) .................................. 2022-026763

(51) Int. Cl.
| | |
|---|---|
| F02D 9/10 | (2006.01) |
| F02B 61/02 | (2006.01) |
| F16K 1/22 | (2006.01) |
| F16K 31/04 | (2006.01) |
| F16K 31/53 | (2006.01) |

(52) U.S. Cl.
CPC ........... F02D 9/1065 (2013.01); F02D 9/107 (2013.01); F02D 9/1085 (2013.01); F02D 9/1095 (2013.01); F16K 1/221 (2013.01); F16K 1/223 (2013.01); F16K 31/043 (2013.01); F16K 31/535 (2013.01); *F02B 61/02* (2013.01); *F02D 9/105* (2013.01); *F02D 9/108* (2013.01)

(58) Field of Classification Search
CPC ...... F02D 9/1065; F02D 9/107; F02D 9/1085; F02D 9/1095; F02D 9/105; F02D 9/108; F16K 1/221; F16K 1/223; F16K 31/043; F16K 31/535; F02B 61/02
See application file for complete search history.

(56) References Cited

U.S. PATENT DOCUMENTS

| | | | |
|---|---|---|---|
| 2006/0157027 A1* | 7/2006 | Ichikawa ................ | F02D 11/10 123/399 |
| 2006/0231072 A1* | 10/2006 | Saito ....................... | F02D 9/107 123/399 |
| 2008/0029060 A1* | 2/2008 | Ikeda ...................... | F02D 9/107 29/888.46 |

(Continued)

FOREIGN PATENT DOCUMENTS

| | | |
|---|---|---|
| CN | 113503212 A | 10/2021 |
| EP | 2 428 665 A1 | 3/2012 |
| JP | 2010-53713 | 3/2010 |

OTHER PUBLICATIONS

Extended European Search Report Application issued Aug. 21, 2023 in corresponding EP Application No. 23 15 7521.

*Primary Examiner* — Phutthiwat Wongwian
*Assistant Examiner* — Susan E Scharpf

(57) ABSTRACT

In a throttle device including: a throttle shaft to which a throttle valve is secured; a motor; and a deceleration mechanism decelerating rotation of a drive shaft of the motor and transmitting the rotation to the throttle shaft, the deceleration mechanism includes a throttle gear secured to the throttle shaft, the throttle gear includes a tubular ring into which the throttle shaft is detachably inserted and a gear main body including a gear portion, and the gear main body is formed of a resin by insert processing including the ring.

13 Claims, 6 Drawing Sheets

(56) References Cited

U.S. PATENT DOCUMENTS

| | | | |
|---|---|---|---|
| 2009/0255121 A1* | 10/2009 | Ichikawa | F16K 27/0227 29/890.127 |
| 2011/0056461 A1* | 3/2011 | Kondo | F02D 9/105 123/403 |
| 2014/0144407 A1* | 5/2014 | Khan | F16K 31/535 74/435 |

* cited by examiner

THROTTLE DEVICE

CROSS REFERENCE TO RELATED APPLICATIONS

This application claims the priority benefit of Japanese Patent Application No. 2022-026763 filed on Feb. 24, 2022, the contents of which are incorporated herein by reference.

BACKGROUND OF THE INVENTION

Field of the Invention

The present invention relates to a securing structure between a throttle shaft and a drive gear in a throttle device that controls air intake of an engine.

Description of the Related Art

An engine mounted in a motorcycle or the like includes a throttle device for controlling the amount of air intake. The throttle device is configured to drive a throttle valve provided in an air intake path of the engine using a motor, for example.

For example, Japanese Patent Laid-Open No. 2010-53713 discloses a throttle device including four throttle valves. The throttle device is used for an in-line four-cylinder engine and includes a throttle shaft to which four throttle valves are secured in an aligned manner and a motor driving and rotating the throttle shaft. A decelerator configured of two pairs of gears are interposed between a rotation drive shaft of the motor and the throttle shaft.

Also, the throttle shaft includes a return spring (pivoting spring) for defining an opening degree of the throttle valve when the motor stops. The return spring is a coil spring provided between a case of the decelerator and a drive gear (driven gear) provided at the throttle shaft and biases the case to rotate the drive gear. Additionally, the drive gear of the throttle shaft and the case include stoppers that restrict a predetermined or larger rotation angle range of the drive gear.

The drive gear is formed of a resin or the like for weight reduction while the throttle shaft is formed of metal or the like in the throttle device as described above in many cases. Also, including a support portion for the return spring and a stopper at an outer shape portion of a member (lever) including a hole, into which the throttle shaft is inserted, at the center portion and formed of metal or the like into a disk shape to secure strength is conceivable.

In this manner, a structure in which a tubular ring (bushing) into which the throttle shaft is further inserted is prepared at a securing portion securing the gear made of a resin, the lever including the support portion and the stopper for the return spring, and the throttle shaft, the drive gear including the disk-shaped lever is insert-molded, and a ring is secured to the drive gear including the lever through caulking, for example, is conceivable.

However, there is a problem in that since the insertion hole for the throttle shaft may collapse and insertion may not be able to be achieved if the caulking is performed on the ring, it is necessary to work the ring after the caulking with a reamer or the like to enable the throttle shaft to be inserted, and this increases manufacturing cost.

SUMMARY OF THE INVENTION

The present invention was made in view of such a problem, and an object thereof is to provide a throttle device capable of facilitating manufacturing of a gear with a complicated structure while securing strength of a portion secured to a throttle shaft and capable of reducing manufacturing cost.

In order to achieve the above object, a throttle device according to the present invention includes: a throttle shaft to which a throttle valve is secured; a motor; and a decelerator including a gear secured to the throttle shaft, decelerating rotation of a drive shaft of the motor, and transmitting the rotation to the throttle shaft, the gear including a tubular ring member into which the throttle shaft is detachably inserted and a gear main body including a gear portion, and the gear main body being formed by insert processing including the ring member.

Preferably, the ring member may include a chamfered portion formed at a part of a cylindrical outer circumferential surface that is in contact with the gear main body.

Preferably, the ring member may be formed by chamfering the cylindrical outer circumferential surface.

Preferably, the ring member may include a groove extending in a circumferential direction.

Preferably, the throttle device may further include: a biasing portion rotation-biasing the throttle shaft; and a support member supporting an end of the biasing portion, the gear being integrally formed by insert processing including the support member and the ring member.

Preferably, the ring member may be formed of metal, and the gear is formed of a resin.

Preferably, the ring member and the support member may be formed of metal, and the gear is formed of a resin.

Preferably, the throttle device may be included in an engine of a motorcycle and control the amount of air intake of the engine.

According to the throttle device of the present invention, the gear secured to the throttle shaft includes the tubular ring member and the gear main body formed through insert processing, and it is thus possible to use different materials for the ring member and the gear main body. Therefore, it is possible to cause the ring member to have relatively high strength and to secure strength of the securing portion between the throttle shaft and the gear. Since the gear main body is formed through insert processing, it is possible to easily form the gear with a complicated shape and to achieve weight reduction of the entire gear by forming the gear from a light material.

Furthermore, since the ring member and the gear main body are secured through insert processing, deformation of the ring member is curbed, and it is not necessary to perform post-processing after the insert processing. It is thus possible to reduce manufacturing cost of the gear and to provide an inexpensive throttle device.

DETAILED DESCRIPTION OF THE PREFERRED EMBODIMENTS

Hereinafter, an embodiment of the present invention will be described on the basis of the drawings.

Figure 1:
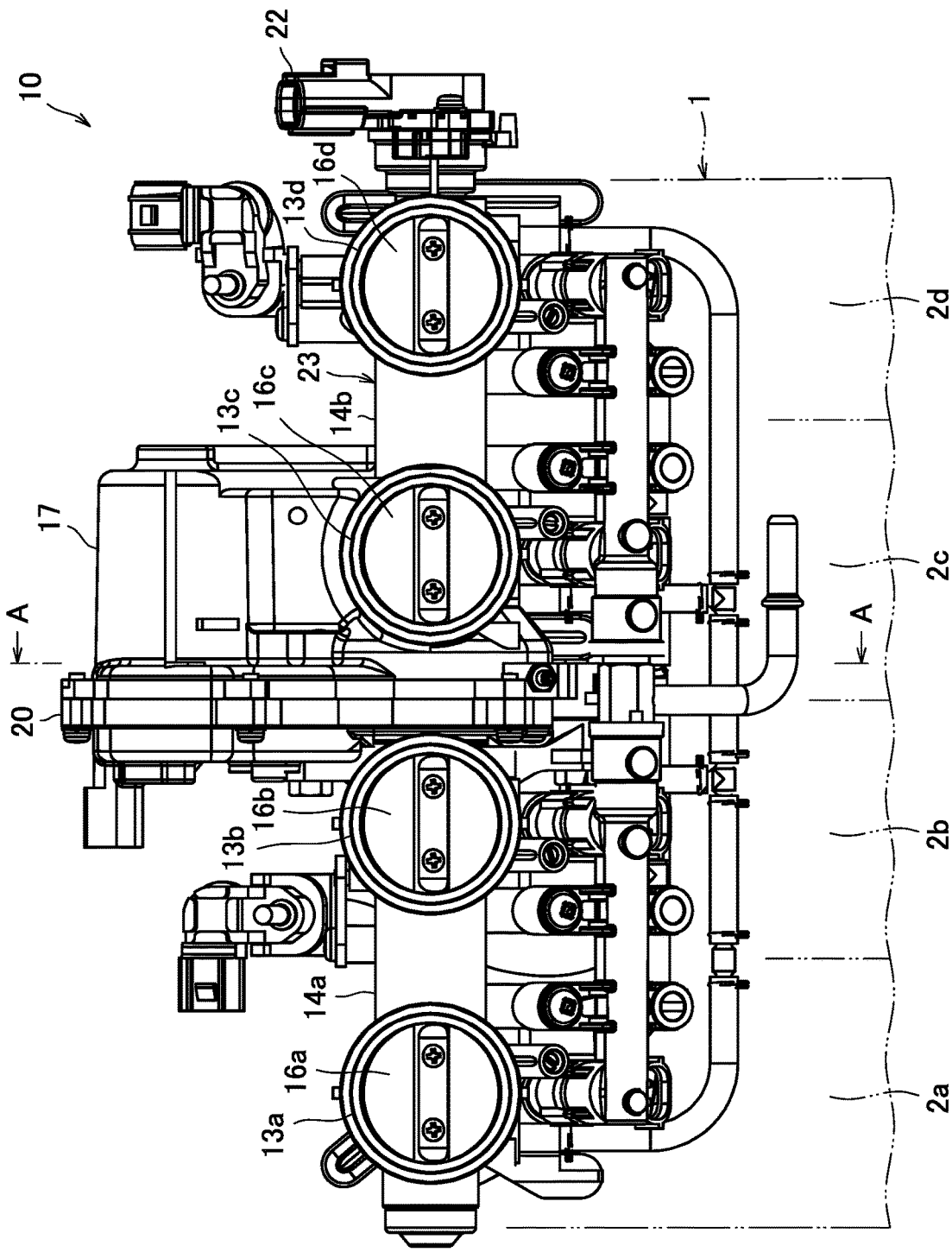
FIG. 1 is an external view of a throttle device according to an embodiment of the present invention.
Figure 2:
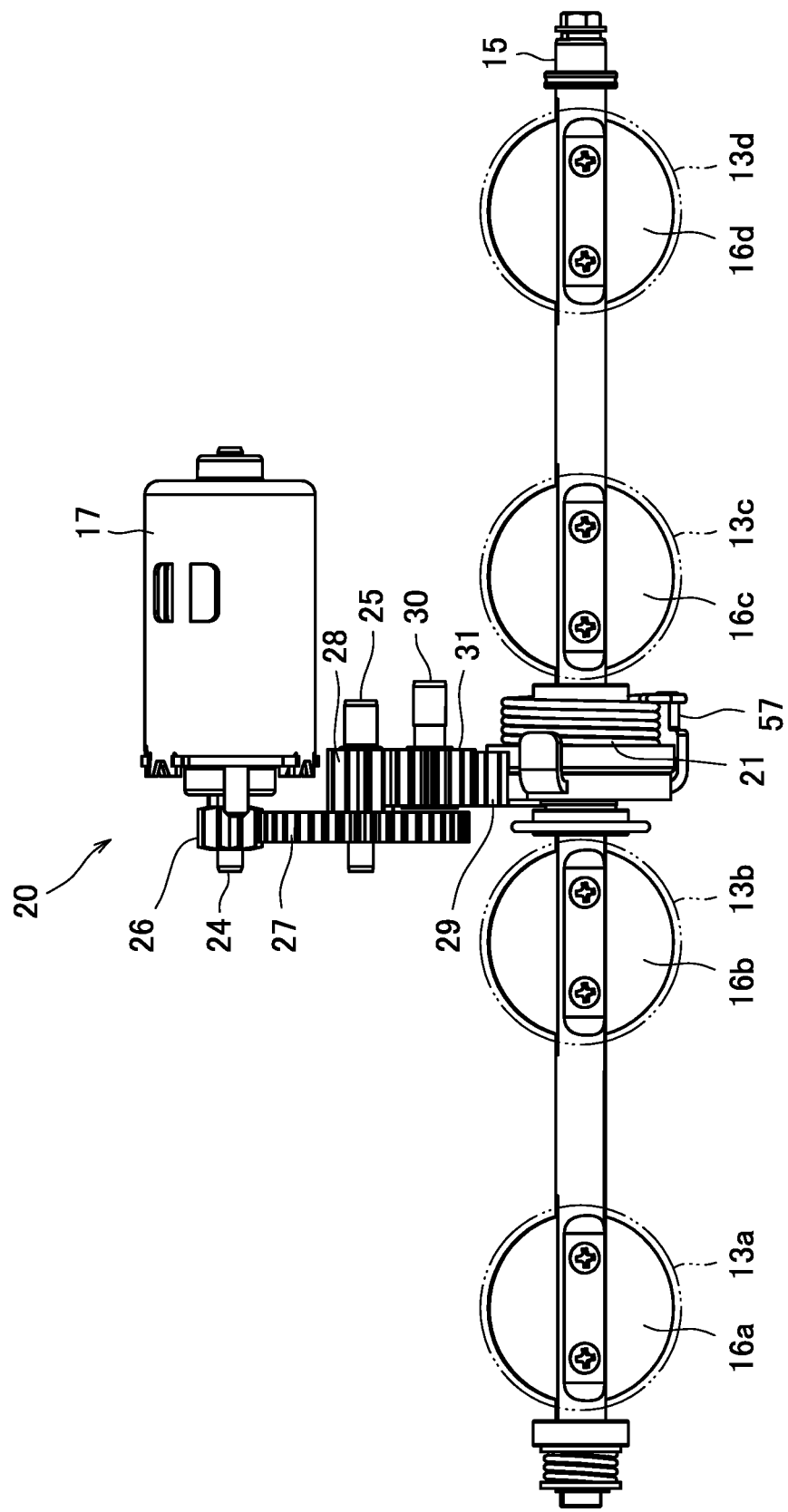
FIG. 2 is a schematic configuration diagram of a drive portion of the throttle valve.
Figure 3:
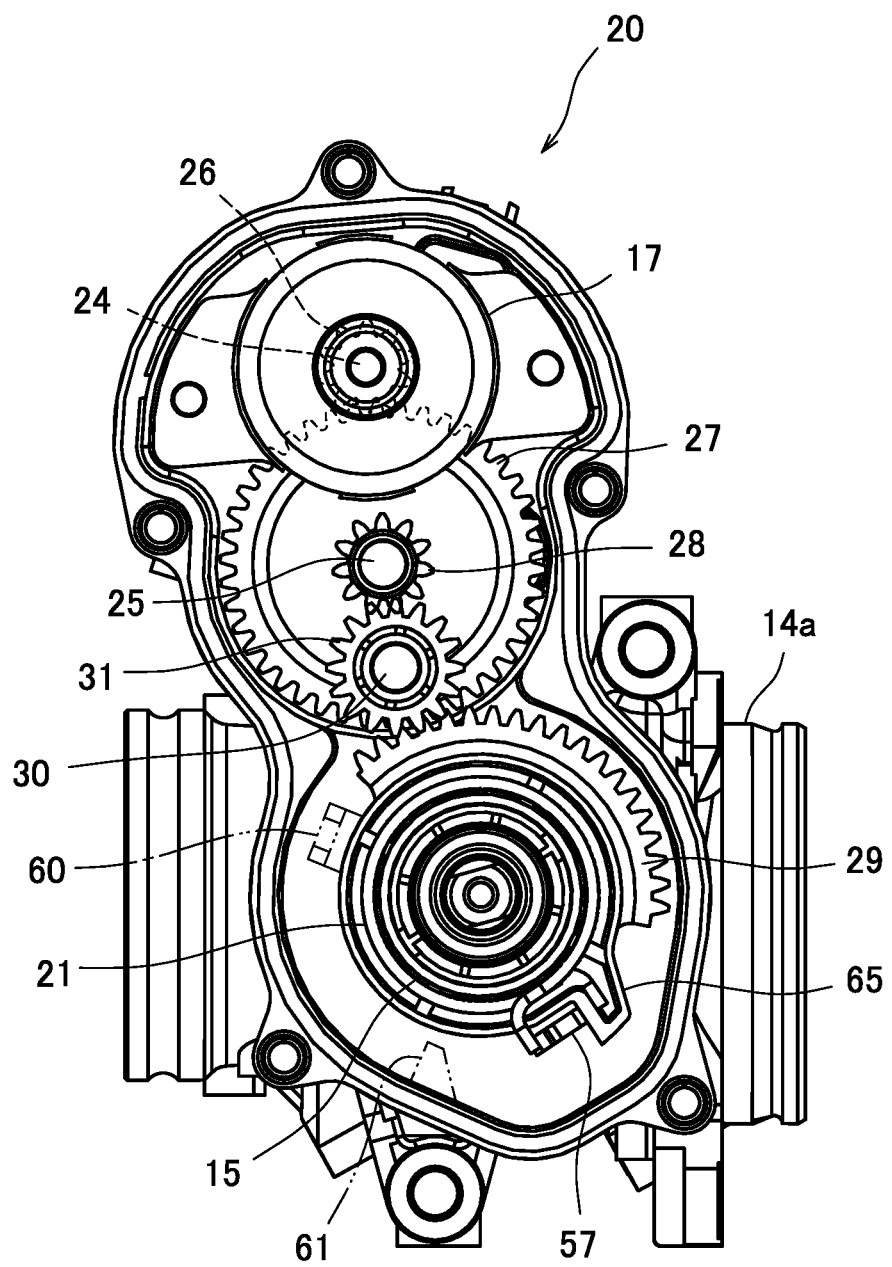
FIG. 3 is an internal structure diagram of a deceleration mechanism.

FIG. 1 is an external view of a throttle device 10 according to an embodiment of the present invention. FIG. 2 is a schematic configuration diagram of a drive portion of the throttle device 10. FIG. 3 is an inner structure diagram of a deceleration mechanism 20 (decelerator). Note that FIG. 3 is a sectional view along the portion A-A illustrated in FIG. 1.

The throttle device 10 according to the present invention is a multiple-type throttle device that is attached to a multi-cylinder engine and controls the amount of air intake. The throttle device 10 in the present embodiment is employed in an in-line four-cylinder engine 1 mounted in a vehicle such as a motorcycle. The engine 1 is disposed in a vehicle such that four cylinders (2a, 2b, 2c, 2d) from #1 to #4 are aligned in order in a vehicle width direction (left-right direction).

As illustrated in FIG. 1, the throttle device 10 includes a first segment body 14a in which an air intake path 13a for the #1 cylinder 2a and an air intake path 13b for the #2 cylinder 2b are formed and a second segment body 14b in which an air intake path 13c for the #3 cylinder 2c and an air intake path 13d for the #4 cylinder 2d are formed.

The deceleration mechanism 20 is included between the first segment body 14a and the second segment body 14b, that is, between the air intake path 13b for the #2 cylinder 2b and the air intake path 13c for the #3 cylinder 2c. Also, a motor 17 is connected to the deceleration mechanism 20.

As illustrated in FIGS. 1 and 2, the throttle device 10 further includes a throttle shaft 15, throttle valves 16a to 16d, the deceleration mechanism 20, a return spring 21 (biasing portion), and a throttle position sensor 22. Note that FIG. 2 illustrates a structure of a drive portion included inside the throttle device 10, the air intake path 13a is provided with the throttle valve 16a, the air intake path 13b is provided with the throttle valve 16b, the air intake path 13c is provided with the throttle valve 16c, and the air intake path 13d is provided with the throttle valve 16d.

The first segment body 14a and the second segment body 14b are disposed to be aligned in the left-right direction (vehicle width direction) in accordance with the corresponding cylinders 2a to 2d thereby to form a unit body 23 (throttle body).

The air intake paths 13a to 13d are formed to extend to be orthogonal (in the front-back direction in FIGS. 1 and 2) to the vehicle width direction (left-right direction). The throttle shaft 15 penetrates through the unit body 23, extends in the vehicle width direction, passes inside the four air intake paths (13a, 13b, 13c, and 13d), and is rotatably supported by the unit body 23.

The throttle valves 16a to 16d are disk-shaped members with substantially the same diameter as the inner diameter of the air intake paths 13a to 13d, are secured to the throttle shaft 15, and are disposed inside the air intake paths 13a to 13d. The throttle valves 16a to 16d rotate inside the air intake paths 13a to 13d with rotation of the throttle shaft 15 and can rotate and move to an arbitrary angle between a closed position at which the air intake paths 13a to 13d are closed and an open position at which the air intake paths 13a to 13d are opened.

The motor 17 is an electric motor. The motor 17 is secured to the second segment body 14b, and a rotation drive shaft 24 that is an output shaft is disposed to be parallel with the throttle shaft 15.

The deceleration mechanism 20 is disposed between the first segment body 14a and the second segment body 14b. As illustrated in FIGS. 2 and 3, the deceleration mechanism 20 includes a first intermediate shaft 25, a second intermediate shaft 30, a first gear 26 secured to the rotation drive shaft 24 of the motor 17, a second gear 27 secured to the first intermediate shaft 25 and engaged with the first gear 26, a third gear 28 secured to the first intermediate shaft 25, a fourth gear 31 secured to the second intermediate shaft 30 and engaged with the third gear 28, and a throttle gear 29 secured to the throttle shaft 15 and engaged with the fourth gear 31. The first intermediate shaft 25 and the second intermediate shaft 30 are disposed to be parallel with the rotation drive shaft 24 and the throttle shaft 15 and is rotatably supported by the unit body 23.

The deceleration mechanism 20 transmits rotation of the rotation drive shaft 24 of the motor 17 in the order of the first gear 26, the second gear 27, the first intermediate shaft 25, the third gear 28, the fourth gear 31, and the throttle gear 29 to decelerate the rotation, and drives and rotates the throttle shaft 15.

The return spring 21 is a cylindrical torsion spring disposed to be wound several number of times around the throttle shaft 15 and having one end portion supported by the unit body 23 and the other end portion supported by the throttle gear 29 secured to the throttle shaft 15. The return spring 21 biases the throttle shaft 15 such that the throttle valves 16c and 16d are brought into a closed state or a fully opened state.

The throttle position sensor 22 is included at one end portion of the throttle shaft 15 and has a function of detecting a rotation angle of the throttle shaft 15. The throttle position sensor 22 is disposed at the second segment body 14b, for example.

Next, a structure of the securing portion between the throttle shaft 15 and the throttle gear 29 will be described using FIGS. 4 to 7.

Figure 4:
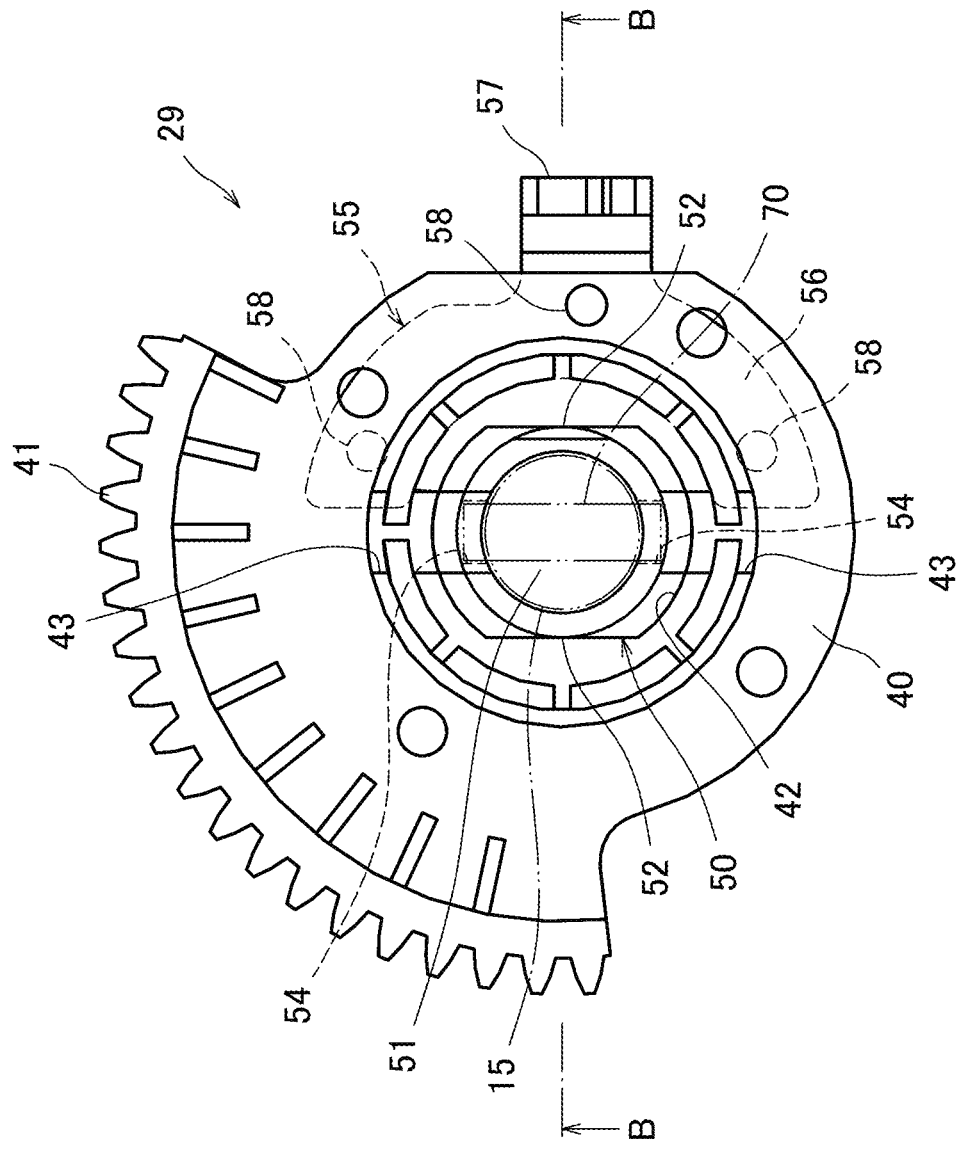
FIG. 4 is an outer shape diagram of a throttle gear.
Figure 5:
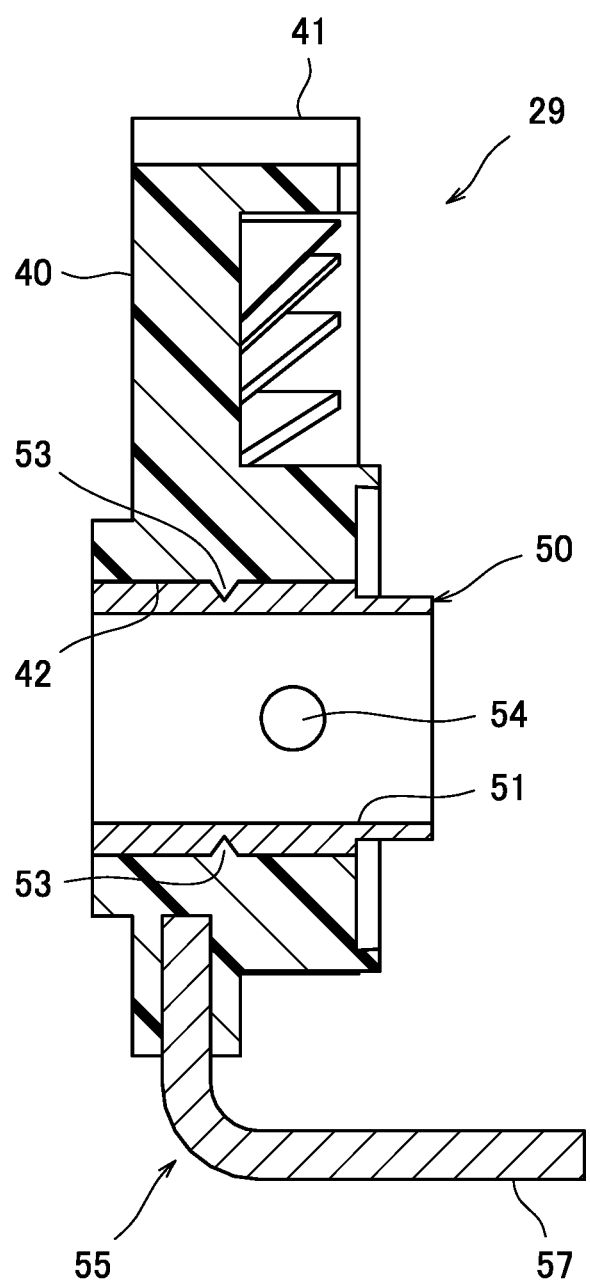
FIG. 5 is a vertical sectional view of the throttle gear.
Figure 6:
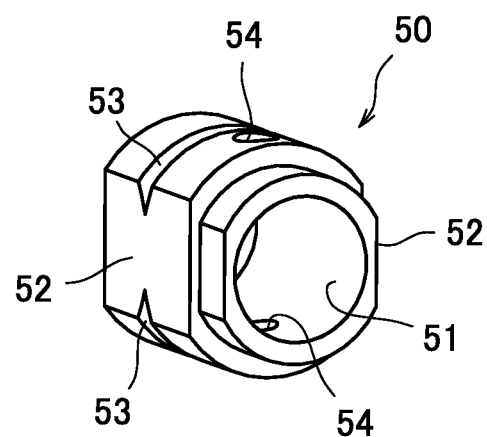
FIG. 6 is a perspective view illustrating an outer shape of a ring.
Figure 7:
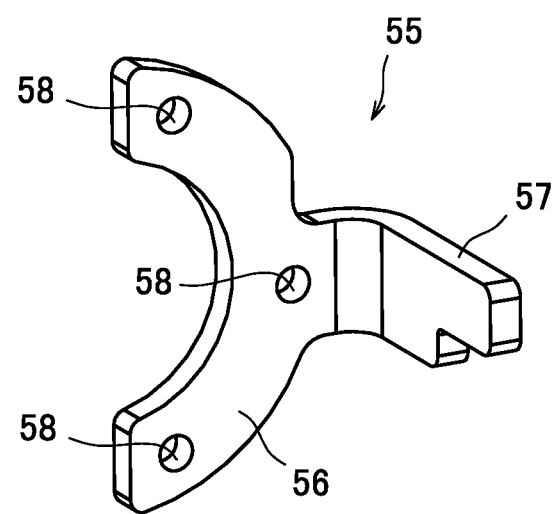
FIG. 7 is a perspective view illustrating an outer shape of a lever.

FIG. 4 is an outer shape diagram of the throttle gear 29. FIG. 5 is a vertical sectional view of the throttle gear 29. FIG. 6 is a perspective view illustrating the outer shape of a ring 50. FIG. 7 is a perspective view illustrating the outer shape of a lever 55. Note that FIG. 4 illustrates a side surface of the throttle gear 29 while FIG. 5 is a sectional view along the part B-B illustrated in FIG. 4.

As illustrated in FIGS. 4 and 5, the throttle gear 29 includes a gear main body 40, the ring 50 (ring member), and the lever 55 (support member).

The gear main body 40 is a disk-shaped gear formed of a resin or the like, and a gear portion 41 such as a spur gear, for example, is formed at a part of the outer circumference. A substantially circular ring insertion hole 42 into which the ring 50 is inserted is provided at the center portion. Note that the ring insertion hole 42 has a shape chamfered in parallel with a shaft center interposed therebetween in accordance with the shape of chamfered portions 52 of the ring 50, which will be described later.

As illustrated in FIG. 6, the ring 50 is a cylindrical member formed of metal such as stainless steel and includes a shaft hole 51 provided at the shaft center such that the throttle shaft 15 penetrates therethrough. Also, a pair of chamfered portions 52 chamfered in parallel with a shaft center interposed therebetween are formed on the outer circumferential surface of the ring 50. Moreover, the intermediate portion of the outer circumferential surface of the ring 50 in the axial direction includes a groove 53 with a V-shaped section provided over the entire circumference except for the chamfered portions 52. Also, a securing hole 54 penetrating in parallel with the chamfered portions 52 and passing through the shaft center is formed in the ring 50.

On the other hand, the lever 55 is configured of a recessed portion 56 disposed to be recessed with a semi-annular shape inside the gear main body 40 and a spring support portion 57 projecting outward in the radial direction from the center portion of the recessed portion 56 in the circumferential direction as illustrated in FIG. 7.

The spring support portion 57 extends outward in the radial direction from the outer circumferential end of the recessed portion 56 and projects outward in the radial direction beyond the gear main body 40, and an end portion of the projecting portion is perpendicularly folded and projects by about 1 cm. One end portion of the return spring 21 is locked at the spring support portion 57 via a ring-shaped support member, which is not illustrated. The other end portion of the return spring 21 is locked at the unit body 23 via a ring-shaped support member 65. The return spring 21 is a cylindrical torsion spring and biases the throttle shaft 15 such that the throttle valves 16a to 16d are brought into a closed state or a fully opened state. Then, the throttle gear 29 rotates against the biasing achieved by the return spring 21 via the deceleration mechanism 20 by operating the motor 17.

Note that the unit body 23 includes a stopper bolt, which is not illustrated, and rotation of the throttle gear 29 is restricted by the distal end thereof abutting the spring support portion 57. In other words, the spring support portion 57 of the lever 55 also has a function of a stopper that restricts rotation of the throttle shaft 15 more than necessary biased by the return spring 21.

Also, circular positioning holes 58 are provided in the recessed portion 56 of the lever 55 to be aligned in the circumferential direction.

The gear main body 40 is provided with a U-shaped groove 43 such that the securing hole 54 of the ring 50 is exposed in a state where the ring 50 is inserted into and secured to the ring insertion hole 42.

Note that the throttle shaft 15 is provided with a hole with the same diameter as that of the securing hole 54 of the ring 50 passing through the shaft center and extending in the radial direction at the attachment position of the throttle gear 29.

The throttle gear 29 and the throttle shaft 15 are detachably secured by inserting a pin 70 into the securing hole 54 of the ring 50 in a state where the throttle shaft 15 is inserted into the shaft hole 51 of the ring 50 of the throttle gear 29 and the throttle gear 29 is adjusted at a predetermined axial-direction position and a rotation position of the throttle shaft 15.

Next, a method for manufacturing the throttle gear 29 will be described.

The ring 50 and the lever 55 made of metal are prepared in advance. The ring 50 may be manufactured by cutting or casting, for example, and the lever 55 may be manufactured of performing steel metal processing on a metal plate. Next, the ring 50 and the lever 55 are set in a mold, and a periphery of the ring 50 and the lever 55 is filled with a material such as a resin to form the gear main body 40. Note that a pin with the same diameter as that of the throttle shaft 15 and a pin inserted into the positioning hole 58 of the lever 55 are provided inside the mold, and it is possible to position the ring 50 and the lever 55 with these pins. The throttle gear 29 is thus manufactured by insert processing.

Note that although the spring support portion 57 of the lever 55 has a function of supporting one end portion of the return spring 21 and also has a function of a stopper restricting a rotation angle range of the throttle gear 29 in the above embodiment, a stopper may be provided separately from the spring support portion 57. For example, a stopper with a shape that is similar to that of the spring support portion 57 projecting from the recessed portion 56 outward in the radial direction beyond a position that is different from that of the spring support portion 57 in the circumferential direction may be included.

Alternatively, the throttle gear 29 may be manufactured by preparing a stopper lever including the recessed portion 56 with a shape that is similar to that of the lever 55 and forming a stopper 60 projecting similarly to the spring support portion 57 as illustrated by the two-dotted dash line in FIG. 3 and insert-processing the stopper lever along with the lever 55 and the ring 50 described above. Note that in this case, it is only necessary to provide, at the unit body 23, a projecting portion 61 which the stopper 60 abuts to restrict the rotation angle range of the throttle gear 29.

As described above, although the throttle device 10 according to the present embodiment drives and rotates the throttle shaft 15 via the deceleration mechanism 20 from the motor 17, the throttle gear 29 of the deceleration mechanism 20 is secured to the throttle shaft 15.

Since the gear main body 40 of the throttle gear 29 is formed of a resin, it is possible to achieve weight reduction. Also, the throttle shaft 15 is secured to the metal ring 50 included in the throttle gear 29. It is possible to secure strength of the securing portion between the throttle shaft 15 and the throttle gear 29 by using the ring 50 made of metal.

Moreover, since the gear main body 40 of the throttle gear 29 is formed of a resin, it is possible to easily form the complicated shape like the gear portion 41. Also, it is possible to easily form the throttle gear 29 through insert processing including the ring 50.

Here, in a case where the ring 50 and the gear main body 40 are separately manufactured, the ring 50 is inserted into the ring insertion hole 42 of the gear main body 40, and the ring 50 and the gear main body 40 are secured through caulking, for example, the ring 50 may be deformed due to the caulking. Therefore, it is necessary to additionally work the shaft hole 51 of the ring 50 with a reamer or the like after the caulking to enable the throttle shaft 15 to be inserted.

On the other hand, since the ring 50 and the gear main body 40 are secured through insert processing in the present embodiment, deformation of the ring 50 is curbed. Post-processing such as reamer processing is thus not necessary, and it is possible to reduce manufacturing cost and to provide an inexpensive throttle device 10.

Also, although the ring 50 has a cylindrical shape, the two chamfered portions 52 are formed on the outer circumferential surface in parallel with the axial line interposed therebetween, and it is thus possible to reliably transmit rotation between the ring 50 and the gear main body 40 by being locked at the ring insertion hole 42 of the gear main body 40 formed in accordance with the shape of the chamfered portion 52.

Also, since the outer circumferential surface of the ring 50 is provided with the groove 53 extending over the entire circumference in the circumferential direction, it is possible to restrict movement of the ring 50 and the gear main body 40 in a thrust direction by a resin entering and being secured to the groove 53 through the insert processing.

In this manner, the rotation position and the axial-direction position of the gear main body 40 are defined by the chamfered portions 52 and the groove 53 relative to the cylindrical ring 50, and strong securing is achieved between the ring 50 and the gear main body.

Also, the throttle gear 29 includes the lever 55 including the spring support portion 57 supporting one end portion of the return spring 21. The lever 55 is installed in the mold along with the ring 50 and secured when the gear main body 40 is formed through insert processing. Therefore, it is possible to easily form the throttle gear 29 including the lever 55. Additionally, since the lever 55 is configured to be included in the throttle gear 29, it is possible to configure a part around the support portion of the return spring 21 with a simple structure.

Although the description of the embodiment will now be ended, modes of the present invention are not limited to the above embodiment. Although the insert processing including the ring 50 and the lever 55 is performed when the throttle gear 29 is manufactured in the above embodiment, for example, the throttle gear 29 may be manufactured by performing insert processing only on the ring 50. In this case, the lever 55 may be secured to the throttle gear 29 with a screw or the like.

Additionally, although the present invention is applied to the throttle device 10 of the four-cylinder engine 1 in the present embodiment, the present invention may be applied to a throttle device of an engine having a plurality of cylinders other than four cylinders.

Also, although the throttle device 10 in the present embodiment drives the throttle valves 16a to 16d with the one motor 17, a plurality of motors may be included, and the number of throttle valves driven by one motor may be a number other than four. Also, a plurality of throttle units in which the motor 17 drives the throttle valves 16 may be included to form the throttle device, and the present invention may be applied to a securing portion between the throttle shaft and to the throttle gear in these throttle units.

Furthermore, the present invention can also be employed for a throttle device of an engine used for applications other than the motorcycle.

REFERENCE SIGNS LIST

1 Engine
10 Throttle device
15 Throttle shaft
16a, 16b, 16c, 16d Throttle valve
17 Motor
20 Deceleration mechanism (decelerator)
21 Return spring (biasing portion)
29 Throttle gear (gear)
40 Gear main body
50 Ring (ring member)
52 Chamfered portion
53 Groove
55 Lever (support member)

What is claimed is:

1. A throttle device comprising:
a throttle shaft to which a throttle valve is secured;
a motor; and
a decelerator including a gear secured to the throttle shaft, decelerating rotation of a drive shaft of the motor, and transmitting the rotation to the throttle shaft,
wherein the gear includes a tubular ring member into which the throttle shaft is detachably inserted and a gear main body including a gear portion,
the tubular ring member having a cylindrical shape and being formed of metal, the tubular ring member having a shaft hole through which the throttle shaft passes at the shaft center and a securing hole passing through the throttle shaft center for inserting a pin that passes through the shaft center and extends in the radial direction,
the gear is formed by resin,
the gear main body is formed by insert processing including the ring member, and
the throttle shaft and the gear including the tubular ring member formed by the insert process, are removably fixed to the gear and the throttle shaft by inserting the pin into the securing hole in the tubular ring member.

2. The throttle device according to claim 1, wherein the tubular ring member includes shaped portions formed at parts of a cylindrical outer circumferential surface in contact with the gear main body, wherein the shaped portions are shaped in parallel with a shaft center interposed therebetween.

3. The throttle device according to claim 1, wherein the outer circumferential surface of the tubular ring member includes a groove extending over the entire circumference except for the shaped portions.

4. The throttle device according to claim 2, wherein the outer circumferential surface of the tubular ring member includes a groove extending over the entire circumference except for the shaped portions.

5. The throttle device according to claim 1, further comprising:
a biasing portion rotation-biasing the throttle shaft; and
a support member supporting an end of the biasing portion,
wherein the gear is integrally formed by insert processing including the support member and the tubular ring member.

6. The throttle device according to claim 2, further comprising:
a biasing portion rotation-biasing the throttle shaft; and
a support member supporting an end of the biasing portion,
wherein the gear is integrally formed by insert processing including the support member and the tubular ring member.

7. The throttle device according to claim 3, further comprising:
a biasing portion rotation-biasing the throttle shaft; and
a support member supporting an end of the biasing portion,
wherein the gear is integrally formed by insert processing including the support member and the tubular ring member.

8. The throttle device according to claim 4, further comprising:
a biasing portion rotation-biasing the throttle shaft; and
a support member supporting an end of the biasing portion,
wherein the gear is integrally formed by insert processing including the support member and the tubular ring member.

9. The throttle device according to claim 5, wherein the tubular ring member and the support member are formed of metal, and the gear is formed of a resin.

10. The throttle device according to claim 6, wherein the tubular ring member and the support member are formed of metal, and the gear is formed of a resin.

11. The throttle device according to claim 7, wherein the tubular ring member and the support member are formed of metal, and the gear is formed of a resin.

12. The throttle device according to claim 8, wherein the tubular ring member and the support member are formed of metal, and the gear is formed of a resin.

13. The throttle device according to claim 1, wherein the throttle device is included in an engine of a motorcycle and controls an amount of air intake of the engine.

* * * * *